United States Patent [19]

Wilkinson

[11] Patent Number: 5,019,957
[45] Date of Patent: May 28, 1991

[54] FORWARD CONVERTER TYPE OF SWITCHED POWER SUPPLY

[76] Inventor: Bruce L. Wilkinson, 5518 Norton St., Torrance, Calif. 90503

[21] Appl. No.: 383,594

[22] Filed: Jul. 24, 1989

[51] Int. Cl.⁵ ............................................. H02H 7/122
[52] U.S. Cl. ....................................... 363/56; 361/91; 361/111
[58] Field of Search .................... 363/17-26, 363/55, 56, 95, 97, 98, 131, 132, 133, 134; 361/18, 88, 91, 111

[56] References Cited

U.S. PATENT DOCUMENTS

| | | | |
|---|---|---|---|
| 4,268,898 | 5/1981 | Brown | 363/56 X |
| 4,336,587 | 6/1982 | Boettcher, Jr. et al. | 363/56 X |
| 4,438,486 | 3/1984 | Ferraro | 363/56 |
| 4,441,146 | 4/1984 | Vinciarelli | 363/56 X |
| 4,652,809 | 3/1987 | Barn | 363/56 X |
| 4,672,517 | 6/1987 | Mandelcorn | 363/56 X |
| 4,736,285 | 4/1988 | Cohen | 363/56 |
| 4,760,512 | 7/1988 | Loftus | 363/56 X |
| 4,809,148 | 2/1989 | Barn | 363/56 X |

*Primary Examiner*—Steven L. Stephan
*Assistant Examiner*—Emanuel T. Voeltz

[57] ABSTRACT

A transformer isolated switched power supply of the forward converter type which includes a clamping circuit for the switching unit of the power supply which recovers the energy stored in the transformer during each switching cycle without any need to dissipate the energy, and which also serves to reverse the flux in the power transformer during each switching cycle to restore the flux capacity of the power transformer to the same level as in other types of converter circuits.

5 Claims, 4 Drawing Sheets

FORWARD CONVERTER TYPE OF SWITCHED POWER SUPPLY

BACKGROUND OF THE INVENTION

The development of the transformer isolated forward converter has resulted in improvements in switched power supplies. This is because the forward converter costs less than the other types of transformer isolated switching power supplies of the prior art, and it is easier to design.

However, forward converters of the prior art are subject to certain disadvantages in some instances in that considerable power must be dissipated in each switching cycle, and also in that often only half of the B/H hysteresis curve of the core is used, resulting in low core efficiency and the requirement of larger cores as compared with other types of converter circuits.

SUMMARY OF THE INVENTION

A transformer isolated switched power supply of the forward converter type which includes a clamping circuit for switching unit of the power supply which provides means for recovering the energy stored in the transformer during each switching cycle without any need to dissipate the energy, and which also serves to reverse the flux in the power transformer during each switching cycle to restore the flux capacity of the power transformer to the same level as in other types of converter circuits.

DETAILED DESCRIPTION OF THE PREFERRED EMBODIMENT

Figure 1:
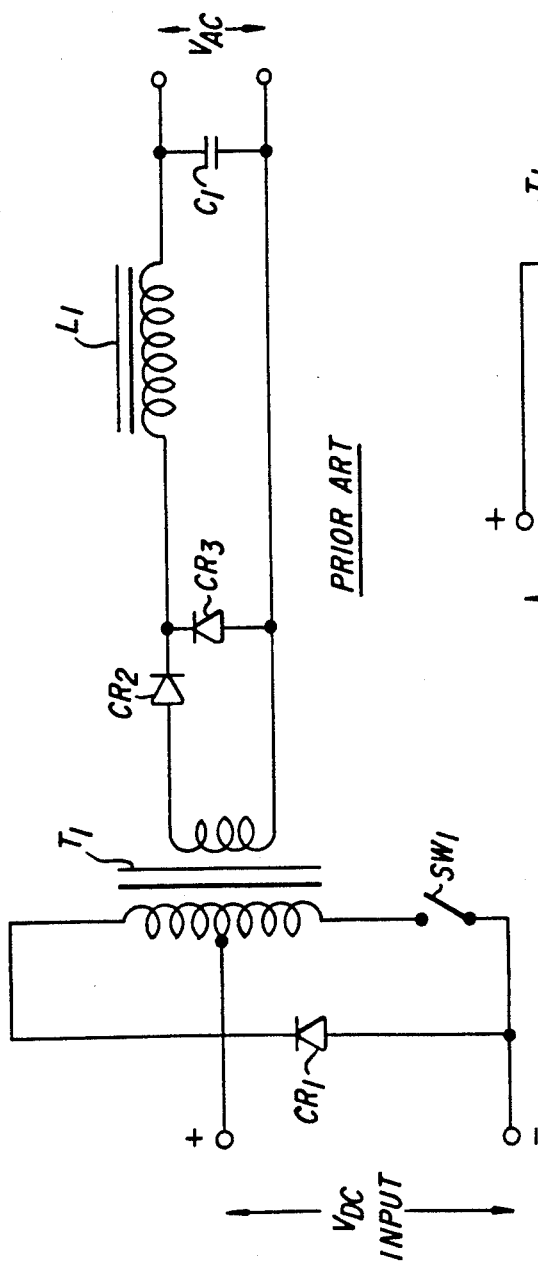
FIGS. 1 and 2 are circuit diagrams showing portions of two types of the prior art transformer isolated switched forward converter power supplies.

The present invention is concerned with the single-ended pulse width modulated, or "forward", converter. A typical prior art forward converter is shown in FIG. 1. In the circuit of FIG. 1, $T_1$ is an isolation transformer with a center tapped primary winding. A direct current input voltage $V_{DC}$ is applied between the center tap and one side of the primary winding through an electronically operated switching circuit designated SW1. The other side of the primary winding is connected back to the negative side of the direct current input voltage $V_{DC}$ through a diode CR1.

One side of the secondary winding of transformer $T_1$ is connected through a diode CR2 and a filter inductor L1 to one of the output terminals of the circuit. The other side of the secondary winding is directly connected to the other output terminal. A diode CR3 is connected between the junction of diode CR2 and inductor L1 and the other side of the secondary. A capacitor C1 is connected across the output terminals.

The circuit of FIG. 1 operates in the following known manner. When switch SW1 is turned on, the direct current input voltage $V_{DC}$ is applied across one-half of the primary winding of transformer $T_1$. This causes a secondary voltage to be induced across the secondary winding which is phased to produce a positive voltage on the anode of diode CR2. This positive voltage causes CR2 to conduct resulting in the secondary voltage being applied to the filter inductor L1. After a period of time, switch SW1 is turned off. The inductance of transformer $T_1$ now causes the voltage across switch SW1 to increase and the voltage across diode CR1 to decrease, and this action continues until the voltage across diode CR1 starts to go negative. Diode CR1 then conducts limiting any further change in the voltage on transformer $T_1$, and this action effectively limits the voltage across switch SW1 to twice the direct current input voltage.

At the same time, the secondary voltage also reverses which reverses the bias on diode CR2 rendering it non-conductive. Diode CR3 then conducts to provide a current path for the energy stored in the inductor L1. During this period, the voltage applied to inductor L1 is effectively zero. The circuit remains in this state for a time approximately equal to the "on" time of switch SW1, at which time the energy stored in transformer $T_1$ is discharged back to the direct current source. The voltage across the primary winding of transformer $T_1$ then falls to zero until switch SW1 is again turned on, causing the cycle to repeat.

The cyclic operation described above causes a train of pulses to be applied to inductor L1, with the duty cycle of the pulses being equal to the duty cycle of the "on" time of switch SW1. Since inductor L1 and capacitor C1 form an averaging filter, the output voltage which appears across capacitor C1 is the average value of the pulse train. This average voltage is determined by the duty ratio of the "on" to "off" period of switch SW1, multiplied by the direct current input voltage, multiplied by the transformer turns ratio. The following equation illustrates the average output voltage as a function of these other parameters:

$$V_{av} = V_{dc} \times N \times \eta \tag{1}$$

Where:
$V_{av}$ = average output voltage
$V_{dc}$ = DC input voltage
N = transformer secondary/primary turn ratio
$\eta$ = duty ratio = $(T_{on})/T$
$T_{on}$ = "on" time of switch SW1
T = the period of a complete switching cycle $(T_{on} + T_{off})$ It should be noted that in order for the energy stored in transformer $T_1$ to be completely discharged back to the direct current source, the "off" time of switch SW1 must be equal to or longer than the "on" time. Therefore, the maximum value of $\eta$ is 0.5.

One of the factors influencing the cost and size of a switching converter is the rating of the main power switching unit SW1. There are two factors to this rating. One of the factors (V) is the voltage that the switch must withstand in the "off" condition. The other factor (A) is the current the switching unit must carry in the "on" condition. These two factors multiplied together establish a volt-ampere (VA) VA rating for the power switching unit which is a rough measure of the cost of this unit. In many instances, the power switching unit consists of several components in series and parallel. In such a case the VA product of the switching unit is equal to the sum of the VA products of the individual components. This means that the number of components which make up the switching unit, and hence its cost is directly proportional to the overall VA product requirement.

The current through switching unit SW1 in the "on" state is the average output current multiplied by the transformer turns ratio N. Turns ratio N is set by the desired output voltage and the minimum direct current input voltage.

Manipulation of the Equation (1) gives:

$$N = \frac{V_{av}}{V_{dc} \times \eta} \quad (2)$$

The maximum value of N and, therefore the maximum input current occurs at the minimum value of $V_{dc}$. Also, as mentioned above, the maximum allowable duty ratio for the circuit is 0.5. Therefore:

$$N = \frac{2 V_{av}}{V_{dc\,(min)}} \quad (3)$$

The current rating of the switch SW1 is then given by:

$$I_{SW} = N \times I_{av} = \frac{2 V_{av} \cdot I_{av}}{V_{dc\,(min)}} = \frac{2 P_{av}}{V_{dc\,(min)}} \quad (4)$$

Where: $P_{av}$ is the rated load power of the converter.

During the "off" state of switch SW1, the diode CR1 is conducting, and this results in a voltage across the full primary of transformer $T_1$ which is twice $V_{dc}$. The voltage rating of SW1 must therefore be at least twice the maximum direct current input voltage. This gives a voltage-ampere product rating for the switch SW1 as follows:

$$VA_{SW1} = 4 P_{av} \frac{V_{dc\,(max)}}{V_{dc\,(min)}} \quad (5)$$

The volt-ampere product given by equation (5) is consistent with the other pulse width modulated converter circuits such as the bridge, half-bridge, and push-pull converters. If the sum of the volt-ampere products of all the switches of any one of the above configurations is taken, then the sum will be identical to the value given in equation (5).

From the above, it would appear that equation (5) represents a fundamental lower limit for the total volt-ampere (VA) product rating of the power switches in a pulse width modulated converter. However, there is a slightly modified version of the circuit of FIG. 1 which permits a lower VA product. This circuit is shown in FIG. 2.

Figure 2:
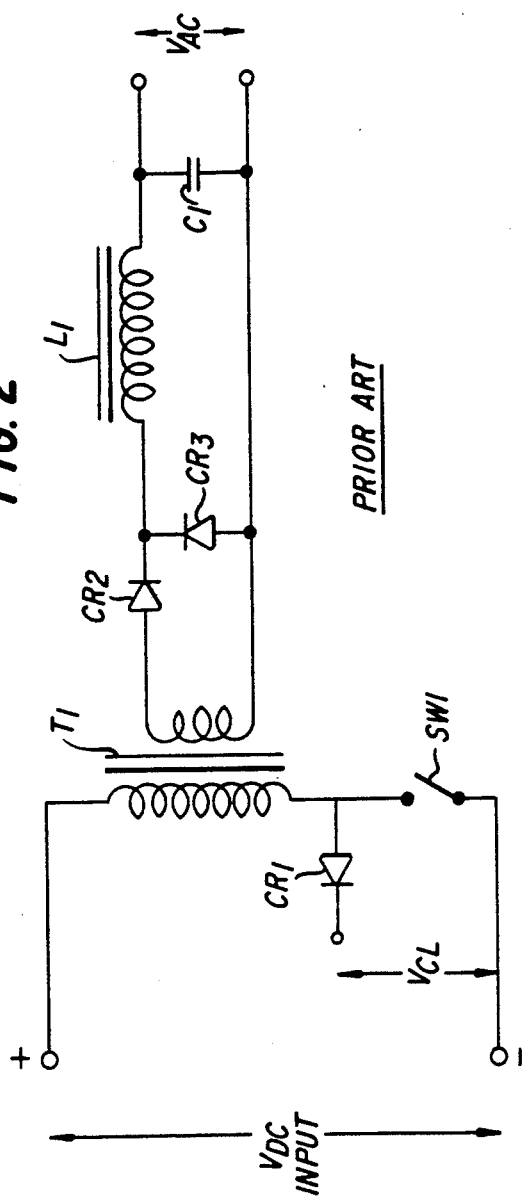

In the circuit of FIG. 2, the $V_{dc}$ input voltage is applied across the entire primary of transformer $T_1$ through the switching unit SW1, and diode CR1 is connected between the junction of the switch and a direct current reference voltage source $V_{cl}$.

In the circuit of FIG. 2, the equation for output voltage is still equation (1), and the switch current is still the product of the average output current and the transformer turns ratio. The voltage $V_{cl}$ is chosen to be equal to the sum of the minimum and maximum values of $V_{dc}$ in.

$$V_{cl} = V_{dc\,(min)} + V_{dc\,(max)} \quad (6)$$

Figure 3A:
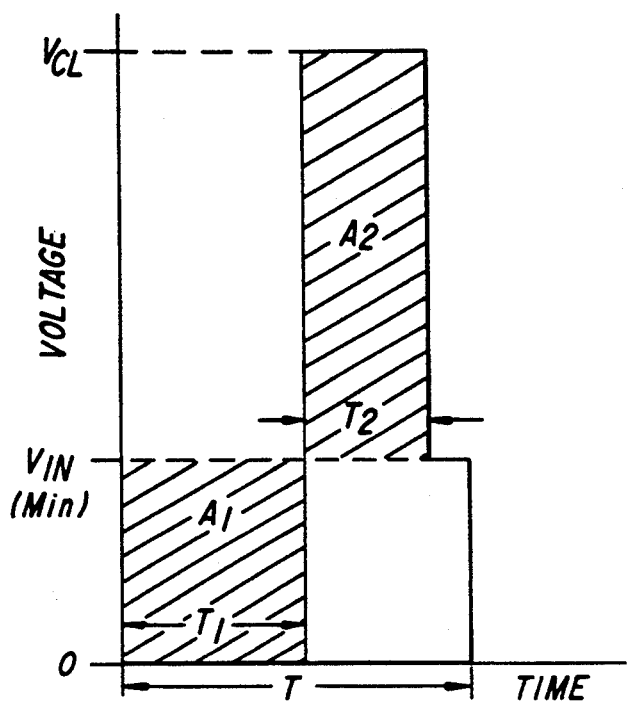
FIGS. 3A and 3B are curves useful in explaining the operation of the switched forward converter power supply.
Figure 3B:
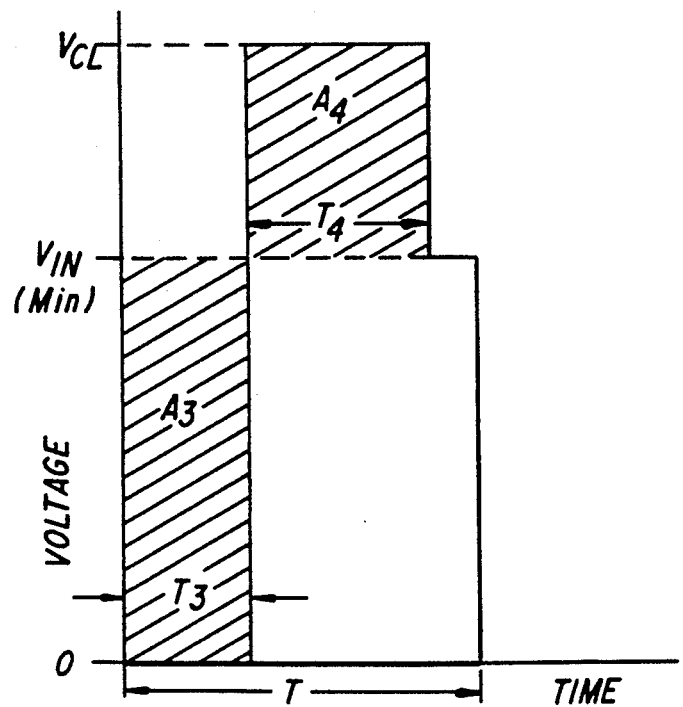

FIGS. 3A and 3B illustrate the voltage waveform across switch SW1 of FIG. 2 for $V_{in(min)}$ and $V_{in(max)}$ respectively.

In FIG. 3A the volt/second area $A_1$ applied across the primary winding of transformer $T_1$ in FIG. 2 must equal the reset volt/second area $A_2$. The same requirement exists for FIG. 3B, in which the area $A_3$ must equal the area $A_4$. In FIGS. 3A and 3B, T is the time for a full period of the waveform; and T must be equal to or greater than the sum of $T_1$ and $T_2$ for FIG. 3A, and equal to or greater than the sum of $T_3$ and $T_4$ for FIG. 3B.

The area $A_1$ in FIG. 3A is given by the product $V_{in(min)} \times T_1$; and the area $A_2$ equals the product $(V_{cl} - V_{in(min)}) \times T_2$. Since the voltage $V_{cl}$ was chosen to equal the sum $V_{in(min)} + V_{in(max)}$, the difference $V_L - V_{in(min)} = V_{in(max)}$. Therefore, the area $A_2$ equals the product $V_{in(max)} \times T_2$. Since $A_1$ must equal $A_2$, the relationship of $T_1$ and $T_2$ is given by:

$$T_1 V_{in\,(min)} = T_2 V_{in\,(max)} \quad (7)$$

From Equation (7), the sum of $T_1$ and $T_2$ becomes:

$$T_1 + T_2 = T_1 \left( 1 + \frac{V_{in\,(min)}}{V_{in\,(max)}} \right) \quad (8)$$

The duty cycle of the circuit of FIG. 2 at minimum input voltage is given by:

$$\eta = \frac{T_1}{T} \quad (9)$$

Where: $\eta$ = duty cycle.

Since the minimum value that T may assume is $T_1 + T_2$ in this case, the maximum duty ratio is given by:

$$\eta_{(max)} = \frac{T_1}{T_1 + T_2} \quad (10)$$

Substituting from equation (8):

$$\eta_{(max)} = \frac{1}{1 + \frac{V_{in\,(min)}}{V_{in\,(max)}}} \quad (11)$$

From equation 11 it can be shown that if $V_{in(min)}$ is less than $V_{in(max)}$ then $\eta_{(max)}$ may be greater than 0.5 which is the duty ratio limit of the circuit of FIG. 1.

Referring to equation (1) the secondary/primary turns ratio (N) of transformer $T_1$ may be reduced, which results in a reduced current in the switch SW1 for the circuit shown in FIG. 2. Equation (4) is modified as shown below:

$$I_{SW} = \frac{P_{av}}{V_{in\,(min)}} \left( 1 + \frac{V_{in\,(min)}}{V_{in\,(max)}} \right) \quad (12)$$

Referring to FIG. 3B, the area $A_3$ represents the volt/second area applied to the primary of transformer $T_1$ during the "on" time of switch SW1 in FIG. 2. For constant frequency operation, the value of T in FIG. 3A must equal the value of T in FIG. 3B. Furthermore, because the average voltage delivered by the converter is proportional to the "on" time volt/second area divided by T, and because one of the objectives of the converter is to deliver a constant average output regardless of the input voltage, the value of $A_1$ of FIG. 3A must equal the value of $A_3$ in FIG. 3B. Also, for the transformer $T_1$ of FIG. 2 to reset fully, $A_4$ must equal $A_3$. It follows that all the volt/second areas $A_1$, $A_2$, $A_3$ and $A_4$ must be equal.

It was shown that $T_2$ is equal to $A_2$ divided by $V_{in(max)}$. From FIG. 3B it can also be seen that $T_3$ equals $A_3$ divided by $V_{in(max)}$. Since all of the areas $A_1$, $A_2$, $A_3$ and $A_4$ are equal, it follows that $T_3$ is equal to $T_2$. Likewise, it follows that $T_4$ is equal to $T_1$. This means that $T_3 + T_4 = T_1 + T_2$ which equals T. For input voltages between $V_{in(min)}$ and $V_{in(max)}$ the sum of the "on" time for switch SW1, and the reset time for transformer $T_1$, for constant average output voltage is less than the time T, which satisfies the requirement for providing sufficient time to reset the transformer during the operating cycle.

The maximum voltage that the switch SW1 in FIG. 2 must withstand is $V_{cl}$ which has been defined as the sum of $V_{in(min)} + V_{in(max)}$. Using equation (12) and this value for maximum voltage on SW1 for FIG. 2, the volt/ampere product rating for switch SW1 in FIG. 2 becomes:

$$VA_{SW1} = \frac{P_{av}}{V_{in\,(min)}} \left(1 + \frac{V_{in\,(min)}}{V_{in\,(max)}}\right)(V_{in\,(min)} + V_{in\,(max)}) \quad (13)$$

Equation 13 may be simplified to the following form:

$$VA_{SW1} = \left(\frac{K+1}{K}\right)^2 P_{av} \cdot \frac{V_{in\,(max)}}{V_{in\,(min)}} \quad (14)$$

Where: $K = \frac{V_{in\,(max)}}{V_{in\,(min)}}$

The form of equation (14) was chosen so that it may be readily compared with equation (5) thereby illustrating the advantage of the circuit shown in FIG. 2 over that of FIG. 1. This comparison is made by comparing the quantity $$\left(\frac{K+1}{K}\right)^2$$

from equation (14) with the constant 4 from Equation (5).

In the extreme case where the input voltage remains constant, $V_{in(min)}$ equals $V_{in(max)}$; then $K=1$ and the quantity $$\left(\frac{K+1}{K}\right)^2 = 4,$$

which shows no advantage. However, in the practical case, where the converter must regulate over a sizable variation of input voltage, a typical value for K is about 2.5. This yields a value for $$\left(\frac{K+1}{K}\right)^2$$

of 1.96 which is substantially less than 4.

The above discussion shows that the circuit of FIG. 2 has a clear advantage over the circuit of FIG. 1 in terms of power switch ratings when the converter must regulate over wide input voltage variations. Furthermore, it can be shown that the power switch rating for the circuit in FIG. 1, as described by Equation (5), is equal to the total power switch ratings of each of the popular push-pull, half bridge, full bridge, circuit configurations, when such circuit configurations are used in a pulse-width modulated regulator type switching converter, in which the output is derived by averaging the rectified output to produce a DC voltage equal to this average.

Therefore, the circuit of FIG. 2 not only has an advantage over the circuit of FIG. 1, but it also has the same advantage over the other circuit configurations listed above.

The foregoing advantages have been recognized by the industry for some time. However, the implementation of the circuit of FIG. 2 has a serious problem. Specifically, the from reference voltage source $V_{cl}$ must absorb all of the energy stored in the inductance of transformer $T_1$ when diode CR1 is conductive. This energy can represent considerable power that must be dissipated in order to maintain the voltage from reference voltage source $V_{cl}$. In the circuit of FIG. 1 this energy does not pose a problem because it is returned to the power source.

Also, the transformer of a usual prior art forward converter is larger than the transformer of the other converter types because the reset schemes of either FIG. 1 or FIG. 2 do not permit the current to fall below zero due to the action of the clamp diode CR1. The result is that the flux in the transformer core may only fall to zero, and it does not reverse as in the other types of converters. This results in an effective flux capacity that is half what it would be in the more symmetrical converters.

U.S. Pat. No. 4,672,517, which is assigned to the present Assignee, describes one particular implementation by which a transformer isolated switched converter may be constructed to utilize both sides of the operating area of the B/H curve of the transformer core. The system of the present invention represents another implementation.

The system of the present invention provides a means for recovering the energy delivered to the clamp voltage $V_{cl}$ in FIG. 2, and also of reversing the flux in the power transformer which restores the flux capacity of the power transformer to the same level as in the other types of converter circuits. One example of the system of the invention is shown in FIG. 4.

Figure 4:
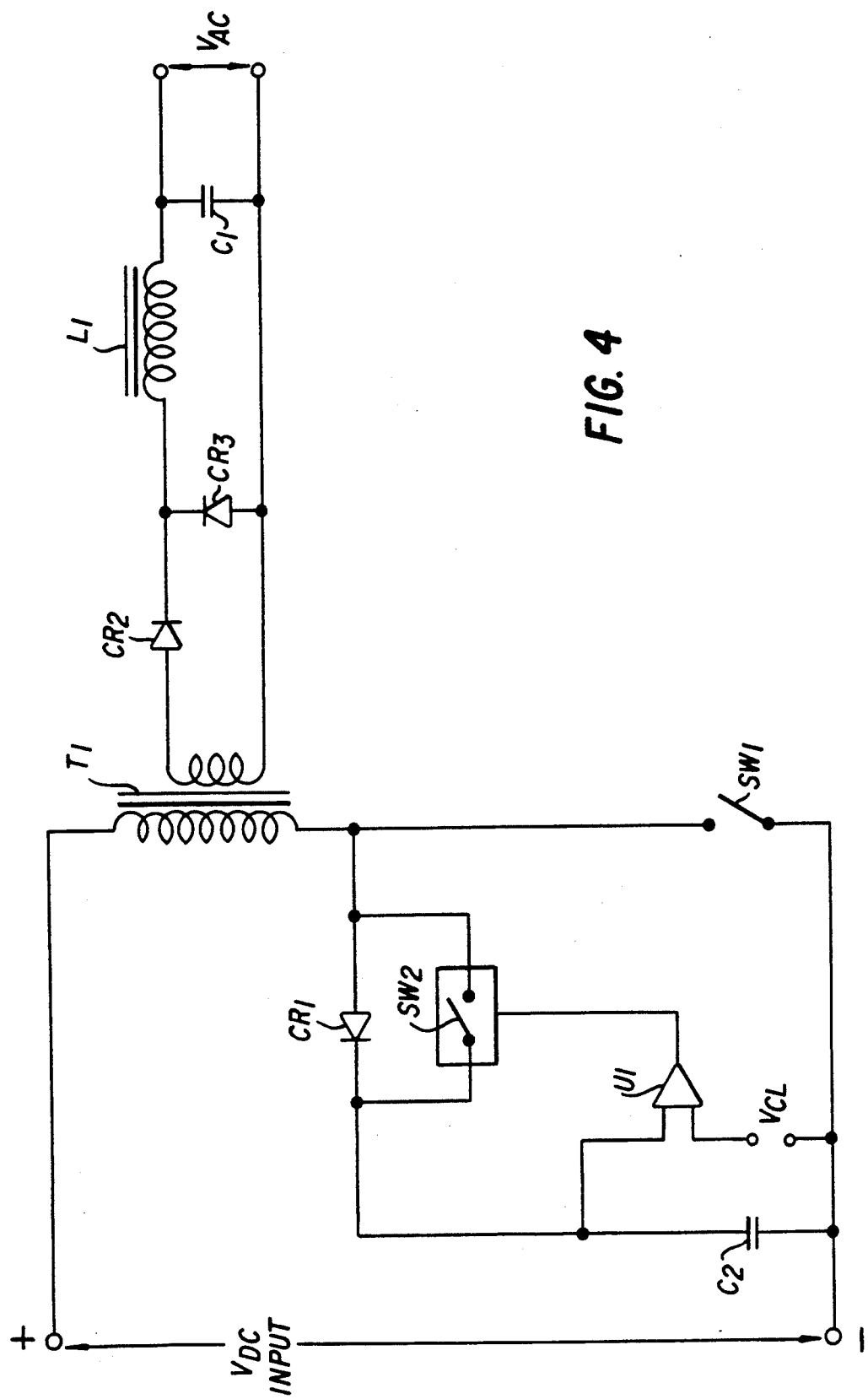
FIG. 4 is a circuit diagram representing one embodiment of the invention as applied to a particular type of switched forward converter power supplies.

The circuit of FIG. 4 is similar to the circuit of FIG. 2, except for the addition of a capacitor C2, a switch SW2, and a comparator U1. Switch SW2 is an active switch similar to switch SW1, but of a much lower power rating. Comparator U1 and switch SW2 are configured so that, when the voltage across capacitor C2 exceeds the reference voltage from reference voltage source $V_{cl}$, switch SW2 is actuated to its "on" state. Conversely, when the voltage across capacitor C2 is less than the reference voltage from reference voltage source $V_{cl}$, switch SW2 is actuated to its "off" state.

When the switch SW1 turns "off", the voltage across the primary of transformer $T_1$ rises until diode CR1 conducts. The energy stored in the inductance of transformer $T_1$ is then delivered to C2, thereby charging C2 above the voltage from reference voltage source $V_{cl}$. Because the voltage of C2 is greater than the voltage from reference voltage source $V_{cl}$, switch SW2 is turned on. When switch SW2 is turned on, the voltage on the primary of $T_1$ remains connected to C2 after the inductive current reverses. Capacitor C2 then discharges into transformer $T_1$ until the voltage on C2 is equal to the voltage from reference voltage source $V_{cl}$. Switch SW2 then switches to its "off" state, releasing the primary of $T_1$ from capacitor C2.

Because capacitor C2 is discharged back to its starting voltage, all of the energy except for losses in diode CR1 and in switch SW2 is returned to the inductance of the transformer $T_1$. Since the inductive current has reversed during this process, the transformer core has also had its flux reversed. Therefore, the limitation of only being able to use half of the flux capacity of the core in a forward converter has been overcome, resulting in the feasibility of a smaller transformer for a given power level, as compared with most prior art forward converters.

The value of capacitor C2 is chosen to be large enough so that, when transformer $T_1$ delivers its energy to the capacitor C2, the voltage changes only a few percent, therefore the voltage across capacitor C2 may be considered essentially constant and equal to the voltage from reference voltage source $V_{cl}$. The voltage from reference voltage source $V_{cl}$ is simply used as a reference and the reference voltage source does not have to dissipate any power.

Figure 5:
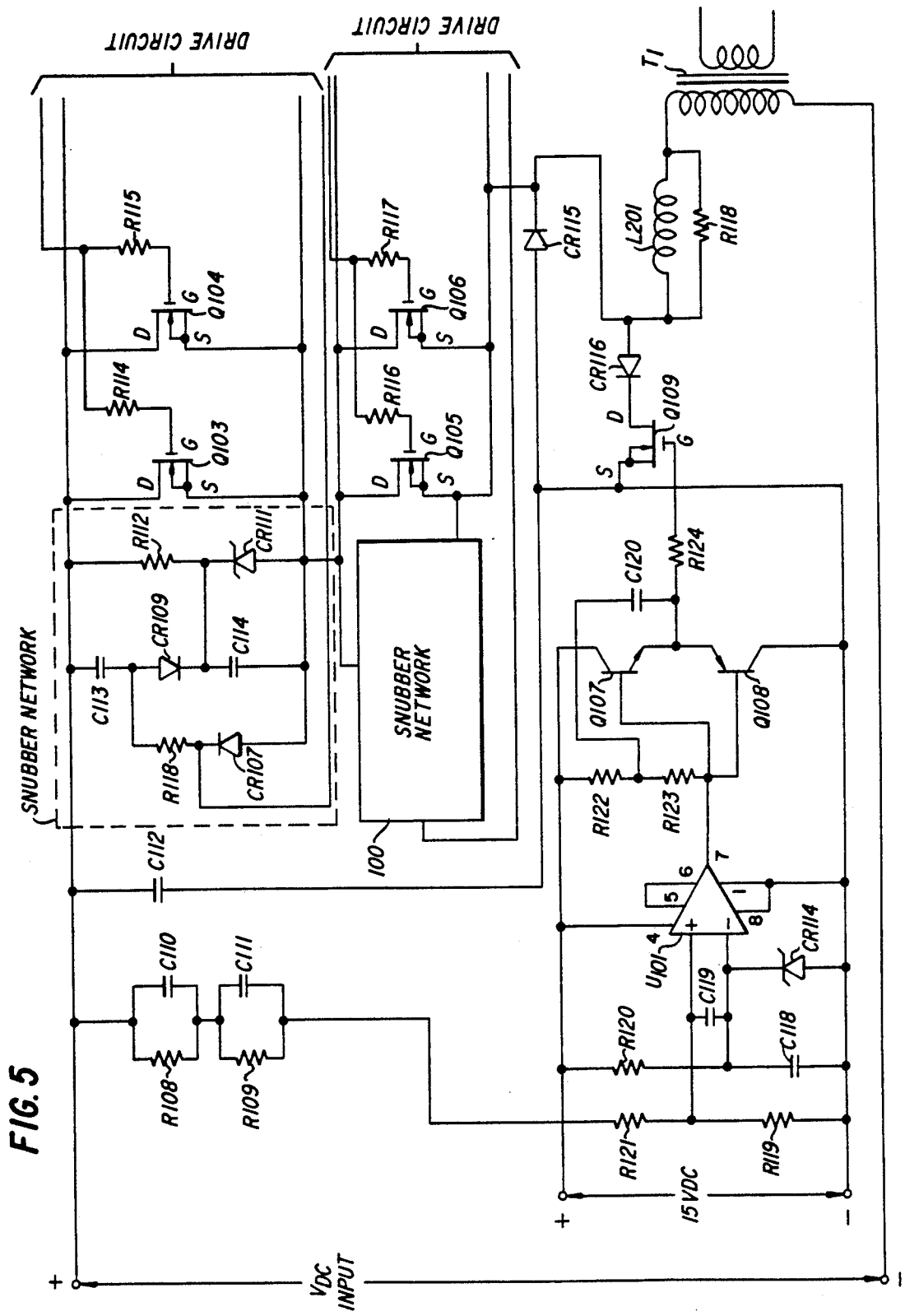
FIG. 5 is a more detailed schematic diagram of the circuit of FIG. 4.

A schematic diagram showing the present embodiment of the invention is illustrated in FIG. 5. The polarities have been inverted in FIG. 5 with respect to the circuits of FIGS. 1, 2 and 4. However, the operating principle of the circuit in FIG. 5 is the same as the circuit of FIG. 4.

The various elements in FIG. 5 have the following values:

R108—180 kilo-ohms
R109—180 kilo-ohms
C110—0.001 microfarads
C111—0.001 microfarads
R120—1 kilo-ohm
R121—10 ohms
C119—0.01 microfarads
R119—6.2 kilo ohms
C118—0.1 microfarads
Zener diode CR114—1N961B
Comparator U101—LM311
R122—1.5 kilo-ohms
R123—1.5 kilo-ohms
Q107—2N2222A
Q108—2N2907A
C120—0.0015 microfarads
R124—10 ohms
FET109—BUZ311
CR116—IN4937
CR115—MUR8100
C112—0.15 microfarads
R110—330 ohms
CR107—1N4937
C113—0.0027 microfarads
CR109—1N4937
C114—1.0 microfarads
R112—100 kilo-ohms
Zener Diode CR111—IN5352
FET Q103, FET Q104, FET Q105, FET Q106—IRFP360
R114—10 ohms
R115—10 ohms
R116—10 ohms
R117—10 ohms The components R118, R112, C113, C114, CR107 and CR111 form a snubber network. A second snubber network 100 of the same circuitry is also included in the circuit.

In the circuit of FIG. 5, the group of FET's Q103, Q104, Q105 and Q106 form the switch SW1 of FIG. 4. The diode CR115 corresponds to diode CR1; FET Q109 and diode CR116 form SW2; capacitor C112 corresponds to capacitor C2; comparator U101 corresponds to comparator U1; and resistor R122, resistor R123, capacitor C120, resistor R124, and transistors Q107 and Q108 form a drive circuit to assure adequate drive to FET Q109 from the output of comparator 101.

In the circuit of FIG. 5, the reference voltage is not equal to the clamp voltage, that is the voltage across capacitor C112. Instead, the reference voltage is set to 10 volts by Zener diode CR114 and resistor R120. The voltage across capacitor C112 is divided down to 10 volts by a voltage divider formed by resistors R108, R109, R121 and R119. Capacitors C110, C111, C119 and C118 are for noise suppression so as to prevent the comparator U101 from actuating the FET Q109 in response to spurious noise pick-up.

The invention provides, therefore, an improved transformer isolated switched power supply of the forward converter type which includes a clamping circuit for the switching means of the power supply to improve the operation of the power supply.

It will be appreciated that while a particular embodiment of the invention has been shown and described, modifications may be made. It is intended in the claims to cover all modifications which come within the true spirit and scope of the invention.

I claim:

1. A switched power supply of the forward converter type including: a transformer having primary and secondary windings; an input circuit having first and second input terminals adapted to be connected to a direct current source, said first input terminal being connected to said primary winding; and first switching means series connected between said second input terminal and said primary winding to cause current flow in said primary winding when said first switching means is turned on; a clamping circuit including a capacitor and a diode series connected across said first switching means, said capacitor being charged to a voltage of a particular polarity by the inductive current in said transformer during an initial portion of each interval during which said first switching means is turned off; second switching means connected across said diode; and control circuitry connected to said capacitor and to said second switching means to cause said second switching means to close after the inductive current in said primary winding reverses to cause said capacitor to be discharged back into said transformer during a subsequent portion of each interval during which said first switching means is turned off after the inductive current in said primary winding reverses.

2. The switched power supply defined in claim 1, in which said control circuitry causes said second switching means to close when the voltage across said capacitor rises above a particular reference voltage and to open when the voltage across said capacitor drops below said reference voltage during each interval when said first switching means is turned off.

3. The switched power supply defined in claim 2, in which the voltage of said direct current source may vary between a minimum value ($V_{dc\ min}$) and a maximum value ($V_{dc\ max}$), and in which the reference voltage is $V_{dcl} = V_{dc\ min} + V_{dc\ max}$.

4. The switched power supply defined in claim 2, in which said control circuitry includes a comparator having a first input connected to said capacitor and having a second input connected to a source of said reference voltage.

5. A switched power supply of the forward converter type including: a transformer having a primary winding and secondary winding; an input circuit to be connected to a direct current source having a first input terminal and a second input terminal, said first input terminal being connected to one side of said primary winding; first switching means series connected between said second input terminal and the other side of said primary winding to cause current to flow in said primary winding when said first switching means is turned on; a clamping circuit including a diode and a capacitor series connected across said first switching means, and a second switching means connected across said diode, said capacitor being charged by the inductive current in said primary winding during an initial portion of each interval during which said first switching mean is turned off; and control circuitry including a comparator having a first input connected to said capacitor and having a second input connected to a source of reference voltage, said comparator having an output connected to said second switching means to cause said second switching means to close when the voltage across said capacitor rises above the voltage of said reference voltage source during an intermediate portion of each interval during which said first switching means is turned off to cause the charge on said capacitor to be discharged back into said primary winding after the inductive current in said primary winding reverses, and to open during a final portion of each interval during which said first switching means is turned off.

* * * * *